United States Patent [19]

Walter et al.

[11] Patent Number: 4,550,479

[45] Date of Patent: Nov. 5, 1985

[54] PROCESS FOR THE PRODUCTION OF A HEAT TREATED BEARING RING

[75] Inventors: Lothar Walter, Schweinfurt; Walter Reith, Bad Bocklet, both of Fed. Rep. of Germany

[73] Assignee: SKF Kugellagerfabriken GmbH, Schweinfurt, Fed. Rep. of Germany

[21] Appl. No.: 467,190

[22] Filed: Feb. 16, 1983

[30] Foreign Application Priority Data

Feb. 20, 1982 [DE] Fed. Rep. of Germany ....... 3206126

[51] Int. Cl.⁴ .............................................. B21D 53/12
[52] U.S. Cl. .................................. 29/148.4 C; 29/418; 29/521; 29/148.4 R; 308/6 C
[58] Field of Search ........................ 308/6 C; 464/168; 29/148.4 C, 418, 463, 521, 524, 148.4 R

[56] References Cited

U.S. PATENT DOCUMENTS 3,262,185 7/1966 Hornigold ......................... 29/418 X
3,316,685 5/1967 Hensel ............................... 29/413 X
3,381,156 4/1968 Johnson ............................ 29/521 X
4,311,348 1/1982 Olschewski et al. ............... 308/6 C Primary Examiner—Mark Rosenbaum
Assistant Examiner—John T. Burtch
Attorney, Agent, or Firm—Yuter, Rosen & Dainow

[57] ABSTRACT

In a process for the production of a heat treated bearing ring with at least one longitudinal slit extending axially therethrough formed by means of two abutting ends lying opposite one another in the circumferential direction, one or more flat band sections of heat treatable strip material are stamped with at least a holding tongue formed on one or both respective abutting ends and a holding recess on the opposite abutting end fitting the respective holding tongue with a force fit. The band section is bent to form a bearing ring, with each holding tongue of the one abutting end radially engaging the respective holding recess of the other abutting end on the respective longitudinal slit. The ring is then heat treated and then the holding tongue is broken out of its respective recess.

3 Claims, 6 Drawing Figures

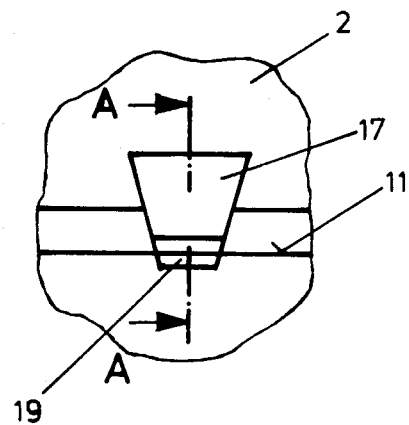
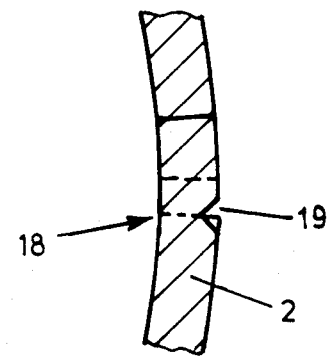
Fig. 4          Fig. 5
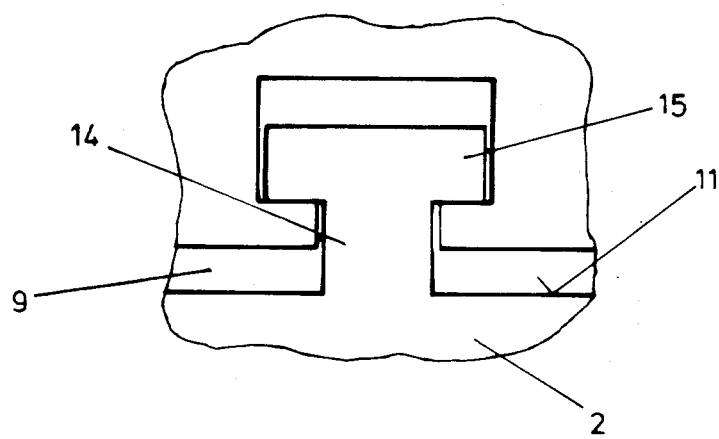
Fig. 6

PROCESS FOR THE PRODUCTION OF A HEAT TREATED BEARING RING

This invention relates to a process for the production of a heat treated bearing ring with at least one slit extending axially and radially therethrough defining a pair of end faces opposed to one another in the circumferential direction.

A bearing of this type is known in which one of the two end faces has two circumferentially extending T-shaped fastening tongues which engage corresponding T-shaped fastening recesses in the other end face of the longitudinal slit, with a force fit, so that the two end faces are held fixed with respect to one another (DE-OS 2 832 744). When this bearing ring is heat treated in order to increase its carrying capacity, the danger arises that the opposed end faces may become so deformed that the bearing surfaces become curved and their precision of shape lost. As a consequence the fastening tongues may become detrimentally locked to one another and bent out of shape.

In one known process for the production of a heat treated bearing ring the facing ends of two half shells of a bearing ring are welded to one another before heat treatment (U.S. Pat. No. 3,262,185). After the heat treatment the welds on the end faces of the two half shells are removed by grinding or the like. This process has the disadvantage that the precision of the bearing ring leaves much to be desired since the bearing ring may become distorted as a result of the build-up of heat during the welding and grinding processes. It is also relatively expensive to produce a bearing ring in accordance with this process since relatively complicated machining of the bearing ring is additionally required to remove the welds after the heat treatment of the bearing ring, in order to produce the axially extending longitudinal slit.

It is therefore an object of the invention to provide a process for the production of a heat treated bearing ring of the above type, which is simple and economical, and which does not result in any danger of distortion of the bearing ring as a result of the heat treatment.

Briefly stated, in accordance with the invention, the two end surfaces formed by the longitudinal slit are latched to one another both in the circumferential direction and in the axial direction as a result of bending of the band section to form a ring with the holding tongues engaging their respective holding recesses. As a consequence, mutual displacement of the two end faces of the longitudinal slit upon heat treatment, as a result of heat distortion, is minimized. Since the holding tongues are engaged with their respective holding recesses before the heat treatment process, for example, the hardening process, they may be readily radially forced into their respective holding recesses and deformed. After the heat treatment, or hardening, of the bearing ring, each holding tongue can be broken out from its respective recesses by a radially directed stamp or the like directed thereagainst. As a consequence the process in accordance with the invention provides a bearing ring whose longitudinal slit or slits have an accurate width and shape in spite of the heat treatment of the bearing ring.

In the event that the bearing ring has not only one longitudinal slit, but, instead, has two or more such slits, the bearing ring may be assembled from two or more ring sections. Each bearing section or ring section is consequently stamped with at least one circumferentially projecting holding tongue on one or both of its respective end surfaces, as well as a holding recess on the respective opposite end surface and adapted to fit the holding tongue. The band sections are assembled to form a complete bearing with the radial engagement of each holding tongue of one end surface in the respective holding recess of the adjacent end surface of the adjacent band section. Following such assembly, the bearing ring is heat treated. Finally each holding tongue of the separate longitudinal slits of the bearing ring is broken out from its respective recess.

In a further feature of the invention, in addition to the holding tongue and recess, the bearing ring is stamped at one or both abutting ends with one or more fastening tongues, and corresponding fastening recesses. Such a bearing ring is especially useful for a linear ball bearing. When the bearing rings have relatively large widths, the fastening tongues engage their respective fastening recesses centrally and the longitudinal slit is provided with a determined width and shape for the provision of a relatively resilient seat of the bearing ring in the housing. The fastening tongues do not seize or become twisted as a result of the heat treatment of the bearing ring since they engage their respective recesses with minimum play. The eventual thermal expansion pressure in the bearing ring is absorbed solely by the holding tongues which engage their respective holding recesses with a force fit without play.

In accordance with a further feature of the invention, the breaking away of the holding tongues from their respective bearing rings is simplified by the provision of a breaking position of reduced thickness at the junctions of the holding tongue and respective abutting end of the end section, since this arrangement minimizes the force required for breaking the holding tongue and enables the breaking to occur at a determined position.

The bearing ring may be finally machined, for example, by grinding, after the heat treatment, for higher precision, in spite of the provision of one or more longitudinal slits, by performing the machining prior to breaking off the holding tongue.

BRIEF DESCRIPTION OF THE DRAWINGS

In order that the invention will be more clearly understood it will now be disclosed in greater detail with reference to the accompanying drawings, wherein:

FIG. 4 is an enlarged view of the portion of the bearing of FIG. 3 within the circle "X";

FIG. 5 is a cross-section taken along the lines A—A of FIG. 4; and

FIG. 6 is an enlarged view of the portion of the bearing ring of FIG. 3 within the circle "Y".

Referring now to FIG. 1, a linear ball bearing is comprised of a bearing ring 2, a sleeve-shaped cage 3 with longitudinally extending races and reversing or turnaround races connected thereto, the cage being assembled in the bearing ring 2. The linear ball bodies further comprises endless rows of spherical rolling bearings 4 guided in the races, and end rings 5 on both ends of the cage. The loaded rolling bodies 4 of each row of the linear ball bearing 1 roll in the lengthwise direction, in each case, between a cylindrical section of the bore section 6 of bearing ring 2 and the outer surface of a cylindrical shaft 7 (shown in dash-dot lines in FIG. 1). The smooth cylindrical outer surface 8 of the bearing ring 2 is concentric with the bore surface 6, the outer surface 8 being adapted to be supported in the bore of a conventional housing (not shown).

Figure 1:
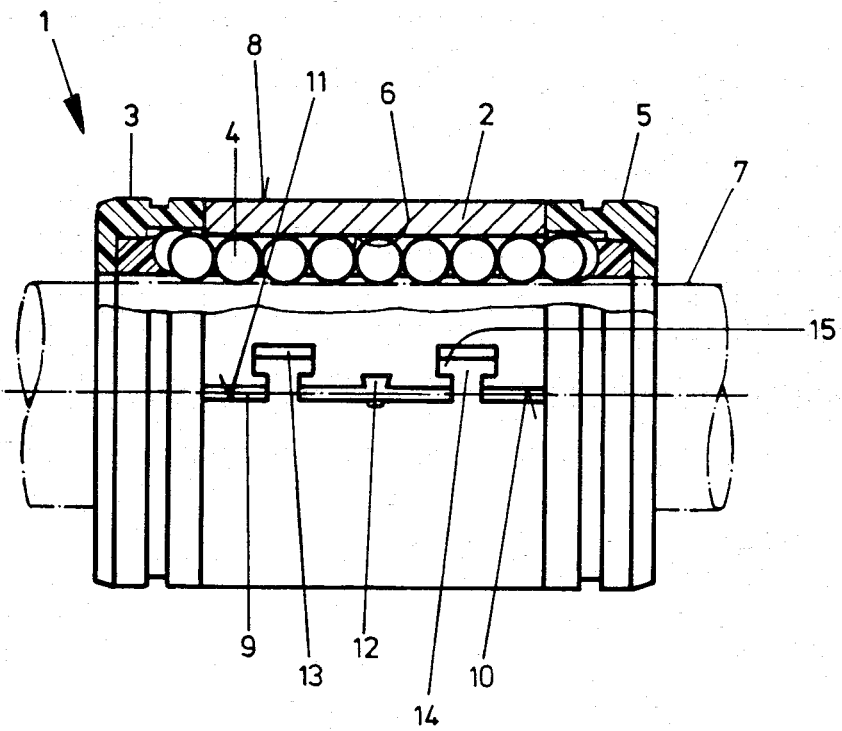
FIG. 1 is a plan view of a linear ball bearing, partially in section, and showing a heat treated bearing ring in accordance with the invention, with the holding tongue removed.

In the above arrangement the bearing ring 2 has a longitudinally extending slit 9 extending axially therethrough, formed by the two abutting end surfaces 10 and 11 of the ring which face one another in the circumferential direction. A wedge or swallow-tail-shaped holding recess 12, decreasing in width toward the respective end face, is formed in the end surface 10 at the center of the bearing ring 2, as illustrated in FIG. 4. In addition, fastening recesses 13, which are T-shaped in the radial top view, are formed in the end surface 10 at both sides of the holding recess 12.

A circumferentially extending fastening tongue 14 is formed on the end surface 11 in the region of each of the two fastening recesses 13, and engaging the respective fastening recess 14. Each fastening tongue 13 has a T-shaped enlargement 15 on its free end, which engages the respective fastening recess 13 with a tight fit. The two end surfaces 10, 11 of the longitudinal slot 9 are held together with minimum play with mutual spacing by means of the fastening tongues 14, so that they can also have only a minimum opposite relative movement in the axial direction.

Figure 2:
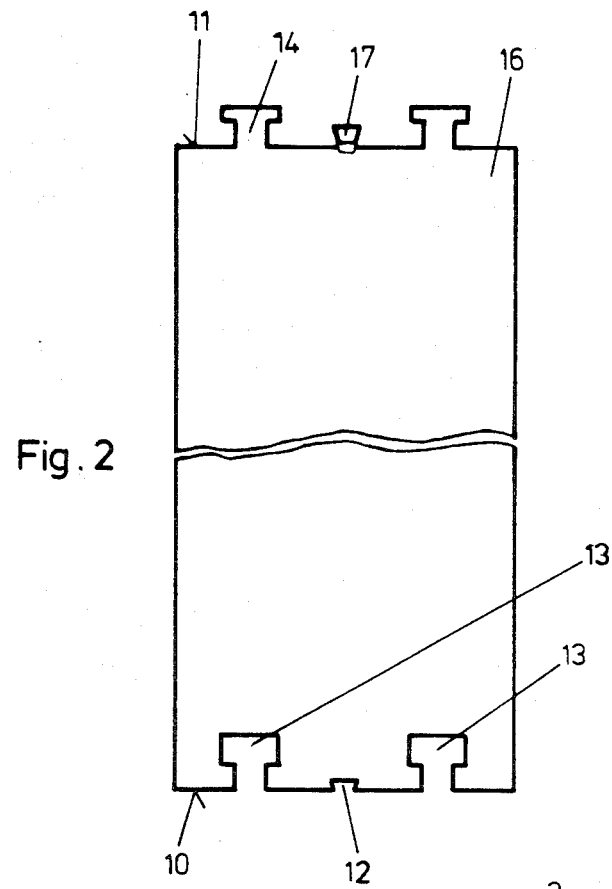
FIG. 2 is a plan view of a band section following stamping thereof in accordance with the invention, prior to heat treatment.
Figure 3:
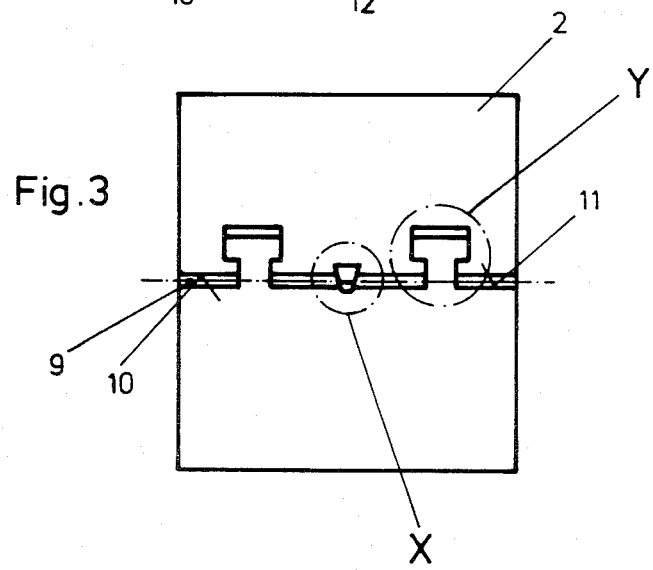
FIG. 3 is a plan view of the bearing ring of FIG. 2 bent into circular form to provide the bearing ring.

The heat treated (hardened) bearing ring 2 of the linear ball bearing 1 is produced by the following process steps:

1. Stamping a flat band 16 of heat-treatable strip material, for example a steel band, with a holding tongue 17 formed on one end surface 11 which projects from the end surface 11, and a suitable holding recess 12 on the opposite end surface 10, adapted to the shape of the holding tongue 17 (FIG. 2). At the same time a breaking position of less thickness than the band section 16 is stamped at the connection point 18 between the holding tongue 17 and the respective joint surface 11, the breaking position being formed in the above case as a notch 19 extending thereacross in the longitudinal direction (FIGS. 4 and 5). In the stamping of the band section 16, moreover, a T-shaped fastening tongue 14 is formed on the abutting end 11 on each side of the holding tongue 17 and a corresponding T-shaped fastening recess 13 is formed on both sides of the holding recess 12;

2. Bending of the band section 16 to form a bearing ring 2 with radial engagement of the holding tongue 17 of the abutting end 11 in the corresponding holding recess 12 of the other abutting surface 10, as well as with the two fastening tongues 14 of the one abutting end 11 engaging a fastening recess 13 of the other abutting end 10 (FIGS. 3 and 6), so that the holding tongue 17 is held without play in its respective holding recess 12, and the two fastening tongues 14 are held with minimum play in their fastening recesses 13;

3. Heat treating, for example, case hardening, of the bearing ring 2;

4. If necessary final machining, for example, lateral and/or cylindrical grinding, of the bearing ring 2; and 5. Breaking off of the holding tongue 17 of the bearing ring 2 from the holding recess 12 by means of a radial die (not shown) or the like, so that the holding tongue 17 breaks off at the notch 19 which serves as the breaking point.

What is claimed is:

1. A process for production of a heat treated bearing ring with a least one longitudinal slit extending axially therethrough, said slit being formed between two opposing ends facing one another in the circumferential direction, comprising:

stamping one or more flat band sections of a heat treatable strip material with at least one holding tongue and at least one fastening tongue extended on at least one opposing end, and at least one holding recess and at least one fastening recess on the opposite end, each holding and fastening recess having a shape substantially the same as the holding and fastening tongue, respectively, then bending the band section to form a bearing ring with engagement of the tongues of the one opposing end in respective recesses of the opposite end along the longitudinal slit, the holding tongues and holding recesses engaging with a tight fit without play therebetween, said fastening tongues and recesses engaging with circumferential and axial play therebetween, then heat treating the bearing ring, said at least one fastening tongue and recess remaining engaged with said play therebetween during said heat treating, and then breaking off the at least one holding tongue of the bearing ring and releasing said tongue from its respective holding recess.

2. The process of claim 1 wherein, in the stamping of the band section, a breaking position of less thickness than the band section is pressed at the connection between the holding tongue and the respective opposing end.

3. The process of claim 1 further comprising final machining of the bearing ring after the heat treatment.

* * * * *

UNITED STATES PATENT AND TRADEMARK OFFICE
CERTIFICATE OF CORRECTION

PATENT NO. : 4,550,479
DATED : November 5, 1985
INVENTOR(S) : Walter et al.

It is certified that error appears in the above-identified patent and that said Letters Patent is hereby corrected as shown below:

Column 2, line 66, change "bodies" to --bearings--.

Column 2, line 67, change "bearings" to --bodies--.

Column 3, line 24, change "recess 14" to --recess 13--.

Column 3, line 24, change "tongue 13" to --tongue 14--.

Signed and Sealed this

Fifth Day of August 1986

[SEAL]

Attest:

DONALD J. QUIGG

Attesting Officer

Commissioner of Patents and Trademarks